US011801501B2

(12) United States Patent
Hur et al.

(10) Patent No.: US 11,801,501 B2
(45) Date of Patent: Oct. 31, 2023

(54) COMPOSITE BODY HAVING NANOPARTICLES UNIFORMLY DISPERSED IN NANO-SIZED PORES IN SUPPORT, AND METHOD FOR PRODUCING SAME

(71) Applicant: KOREA INSTITUTE OF SCIENCE AND TECHNOLOGY, Seoul (KR)

(72) Inventors: Ka Hyun Hur, Seoul (KR); Min Seok Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 389 days.

(21) Appl. No.: 17/269,529

(22) PCT Filed: Jan. 25, 2019

(86) PCT No.: PCT/KR2019/001091
§ 371 (c)(1),
(2) Date: Feb. 19, 2021

(87) PCT Pub. No.: WO2020/040380
PCT Pub. Date: Feb. 27, 2020

(65) Prior Publication Data
US 2021/0178477 A1   Jun. 17, 2021

(30) Foreign Application Priority Data

Aug. 21, 2018 (KR) .................. 10-2018-0097289

(51) Int. Cl.
*B22F 1/07* (2022.01)
*B01J 35/10* (2006.01)
(Continued)

(52) U.S. Cl.
CPC ............... *B01J 35/10* (2013.01); *B22F 1/054* (2022.01); *B22F 1/08* (2022.01); *B22F 3/007* (2013.01);
(Continued)

(58) Field of Classification Search
CPC .................. B22F 1/054; B82Y 40/00
See application file for complete search history.

(56) References Cited

U.S. PATENT DOCUMENTS

| 6,569,358 B1 * | 5/2003 | Tai ................... B82Y 30/00 977/773 |
| 6,686,308 B2 * | 2/2004 | Mao .................. B01J 23/42 502/185 |

(Continued)

FOREIGN PATENT DOCUMENTS

| JP | 2015160989 A | 9/2015 |
| KR | 101322681 B1 | 10/2013 |

(Continued)

OTHER PUBLICATIONS

International Search Report dated May 16, 2019 for PCT/KR2019/001091.

*Primary Examiner* — Adam Krupicka
(74) *Attorney, Agent, or Firm* — CANTOR COLBURN LLP (57) ABSTRACT

Provided are a composite in which metal nanoparticles are evenly dispersed and adsorbed to pores of a support, and a method of preparing the same. An amorphous nanostructure formed of inorganic polymers having a transition metal and a halogen element as a main chain via hydrogen bonding is used as a chemical template for forming the metal nanoparticles. The formed metal nanoparticles are evenly dispersed and adsorbed to the support with pores.

8 Claims, 9 Drawing Sheets

(51) Int. Cl.
  *B22F 3/00*   (2021.01)
  *B22F 3/26*   (2006.01)
  *B82B 3/00*   (2006.01)
  *B22F 1/054*  (2022.01)
  *B22F 1/08*   (2022.01)
  *B82B 1/00*       (2006.01)
  *B82Y 40/00*      (2011.01)
  *B01J 21/08*      (2006.01)
  *B01J 23/44*      (2006.01)
  *B01J 23/46*      (2006.01)
  *B01J 23/50*      (2006.01)
  *B01J 35/00*      (2006.01)
  *B22F 7/06*       (2006.01)
  *B82Y 30/00*      (2011.01)

(52) U.S. Cl.
  CPC .............. *B22F 3/26* (2013.01); *B82B 3/0076* (2013.01); *B01J 21/08* (2013.01); *B01J 23/44* (2013.01); *B01J 23/46* (2013.01); *B01J 23/50* (2013.01); *B01J 35/0046* (2013.01); *B22F 2007/066* (2013.01); *B22F 2301/255* (2013.01); *B22F 2998/10* (2013.01); *B22F 2999/00* (2013.01); *B82B 1/00* (2013.01); *B82Y 30/00* (2013.01); *B82Y 40/00* (2013.01)

(56) References Cited

U.S. PATENT DOCUMENTS 8,679,651 B1 * 3/2014 Ramachandran ........ C09K 5/02
  428/688
2015/0194548 A1   7/2015 Bourdais et al.

FOREIGN PATENT DOCUMENTS

KR   1020140143718 A   12/2014
KR     101636005 B1     7/2016

* cited by examiner

COMPOSITE BODY HAVING NANOPARTICLES UNIFORMLY DISPERSED IN NANO-SIZED PORES IN SUPPORT, AND METHOD FOR PRODUCING SAME

TECHNICAL FIELD

The present invention relates to a composite in which metal nanoparticles are dispersed in a support, and more particularly, to a composite in which nano-sized metal particles prepared using an amorphous nanostructure as a chemical template are evenly dispersed in nano-sized pores of support and a method of preparing the same.

BACKGROUND ART

A support in which nano-sized pores are filled with ultrasmall particles is widely used in catalysts, sensors, and batteries. Nanoparticles in the pores of the support have high thermal and mechanical stability, compared to nanoparticles existing independently.

Since silver (Ag) nanoparticles dispersed in pores of the support have a microbicidal action, they can be used to remove harmful viruses, bacteria and volatile organic compounds. In addition, platinum (Pt) dispersed in the support may be used as a catalyst for a fuel cell.

It is known that it is difficult to uniformly absorb and disperse nanoparticles in pores of a support having 10 nm or less pores (particularly, 5 nm or less). This is caused by a surfactant used in a process of manufacturing nanoparticles. A surfactant surrounding the surface of a nanoparticle has a larger size (hydrodynamic diameter) than the actual size of the nanoparticle. For example, 2 nm nanoparticles behave as if 4 to 6 nm particles are moving in a liquid due to the surfactant thereon. That is, 2 nm nanoparticles cannot enter a pore having 5 nm size.

For this reason, attempts to directly synthesize nanoparticles within several nm sized pores of a support have been widely made. For example, in order to synthesize Pt nanoparticles in pores of a support, after the immersion of the support in a solvent containing a Pt salt, it has been attempted to directly reduce ionic Pt using a reducing agent. However, this method has a disadvantage in which most nanoparticles are formed on the outer surface of the support rather than in pores of the support.

The most preferable method of uniformly absorbing and dispersing nanoparticles within several nm sized pores of the support is to put synthesized nanoparticles into the pores of the support. To this end, there is a need of nanoparticles having no surfactant thereon. In addition, the nanoparticles should be well dispersed in a polar solvent. When the above-described requirements are satisfied, various nanoparticles can be dispersed in nano-sized pores of any type of support.

DISCLOSURE

Technical Problem

The present invention is directed to providing a composite in which metal nanoparticles are evenly dispersed in pores of a support.

The present invention is also directed to providing a method of preparing the composite described above.

Technical Solution

One aspect of the present invention provides a composite, which includes: a support having various pores and positive charge on its surface; and metal nanoparticles that are adsorbed into the pores and have a diameter of 2 to 2.5 nm. Here, the metal nanoparticles include a material with a high standard reduction potential, such as ruthenium (Ru), rhodium (Rh), palladium (Pd), silver (Ag), osmium (Os), iridium (Ir), platinum (Pt), or gold (Au). In addition, a composite may be formed by containing metal nanoparticles including cobalt (Co), sodium (Na), potassium (K), iron (Fe), cadmium (Cd), nickel (Ni), chromium (Cr); thallium (Tl), rubidium (Rb), zinc (Zn), copper (Cu), manganese (Mn), molybdenum (Mo), indium (In), gallium (Ga), bismuth (Bi), titanium (Ti), lead (Pb), aluminum (Al), magnesium (Mg) or antimony (Sb) in pores of the support.

Another aspect of the present invention provides a method of preparing a support, which includes: preparing an amorphous nanostructure with a hydrogen-bonded inorganic polymer having the following Formula 1; mixing a second metal precursor including a second metal element having a higher standard reduction potential than a central metal of the inorganic polymer with the amorphous nanostructure; dissociating the amorphous nanostructure by forming a metal nanoparticle consisting of the second metal element in or on the surface of the amorphous nanostructure; and adsorbing the metal nanoparticles on a support with pores.

[Formula 1]

In Formula 1, M is a transition metal as a central metal, X is a halogen element, CF is a functional group for bonding, which includes a hydrogen element and an element for hydrogen bonding, and, n is a repeat number ranging from 10 to 500,000.

Advantageous Effects

As described above, an amorphous nanostructure is formed through hydrogen bonding of an inorganic polymer having a central metal and a halogen element as a main chain. In addition, when a second metal element having a higher standard reduction potential than the central metal is mixed with an amorphous nanostructure in a polar solvent, it is reduced with a high reducing force, thereby forming 2 nm to 2.5 nm metal nanoparticles. The metal nanoparticles formed in the polar solvent are easily adsorbed into pores of a support surface-treated with cations while they are maintained in a nano size.

Accordingly, when a composite is formed with a support and metal particles, the composite may be used in various applications such as a catalyst according to the kind of second metal element constituting the metal nanoparticles.

Particularly, metal nanoparticles that do not have a functional group on the surface are expected to exhibit excellent performance in a reaction process using a catalyst, and a high specific surface area can be secured since the nanoparticles having nano size are adsorbed into the support.

MODES OF THE INVENTION

The present invention may have various modifications and various examples, and thus specific examples are illustrated in the drawings and described in detail in the detailed description. However, it should be understood that the present invention is not limited to specific embodiments, and includes all modifications, equivalents or alternatives within the spirit and technical scope of the present invention. In description of each drawing, like numerals denote like elements.

Unless defined otherwise, all terms used herein, including technical and scientific terms, have the same meaning that is generally understood by those skilled in the art. General terms, such as terms defined in dictionaries, should be interpreted with meanings according to the context of related technology, and should not be interpreted with ideal or excessively formal meanings unless clearly defined herein.

Hereinafter, an exemplary embodiment of the present invention will be described in further detail with reference to the accompanying drawings.

Embodiment

In this embodiment, a metal nanoparticle having a diameter of 2 nm to 2.5 nm is formed using an amorphous nanostructure in which inorganic polymers are hydrogen-bonded. A second metal precursor including a second metal element having a higher standard reduction potential than a central metal forming the amorphous nanostructure is mixed with the amorphous nanostructure. The second metal element ionized in a polar solvent is absorbed to the amorphous nanostructure, and then reduced by the central metal. The second metal element is formed into a spherical nanoparticle on the surface or in a pore of the amorphous nanostructure due to the reduction of the ionized second metal element.

In addition, during the reduction of the second metal element, the central metal is increased in oxidation number and ionized, and thus the amorphous nanostructure is dissociated.

The synthesized metal nanoparticle and a support having a mesopore is formed as a composite through simple stirring and filtration at room temperature. The composite has a structure in which the support is included and the metal nanoparticles are uniformly dispersed in nanopores of the support.

Hereinafter, the structure of the inorganic polymer constituting the amorphous nanostructure used to form a metal nanoparticle, the synthesis of the amorphous nanostructure, and the preparation of the amorphous nanostructure will be described.

Figure 1:
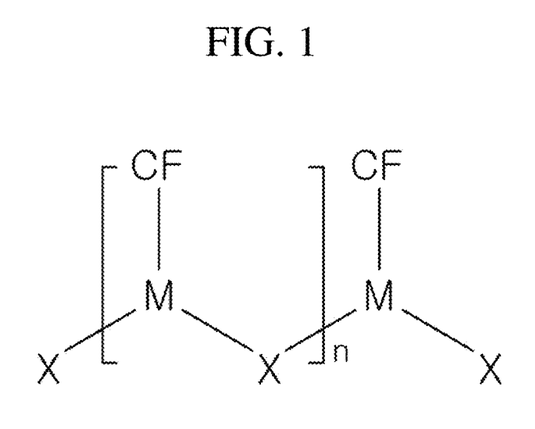
FIG. 1 is a molecular formula of an inorganic polymer according to an exemplary embodiment of the present invention.

FIG. 1 is a molecular formula of an inorganic polymer according to an exemplary embodiment of the present invention.

Referring to FIG. 1, M is a transition metal having an oxidation number of 1, X is a halogen element, and CF is a functional group for bonding. The functional group for bonding has a hydrogen element and an element for hydrogen bonding.

The transition metal M may be copper (Cu), manganese (Mn), iron (Fe), cadmium (Cd), cobalt (Co), nickel (Ni), zinc (Zn), mercury (Hg), molybdenum (Mo), titanium (Ti), magnesium (Mg), chromium (Cr) or antimony (Sb).

In addition, the halogen element may be fluorine (F), chlorine (Cl), bromine (Br) or iodine (I).

The functional group for bonding is a compound having a hydrogen element and an element for hydrogen bonding. The functional group for bonding chemically bonds with the transition metal, and forms a hydrogen bond with a neighboring inorganic polymer through the hydrogen element. To this end, the functional group for bonding preferably has a hydrogen element and an element for hydrogen bonding at the end of a chemical bond. The element for hydrogen bonding may be a Group 15 or 16 element, and oxygen, sulfur, nitrogen, selenium or tellurium may be used as element for hydrogen bonding.

In addition, the functional group for bonding in the inorganic polymer may form a hydrogen bond with a halogen element of another inorganic polymer.

The functional group for bonding is preferably thiourea, urea, selenourea, tellurourea or a thiol compound.

The hydrogen element of the functional group for bonding may form a hydrogen bond with an element for hydrogen bonding or halogen element of another organic polymer. Inorganic polymers are bonded with each other by hydrogen bonding, thereby forming an amorphous nanostructure.

In the inorganic polymer, the transition metal and the halogen element form a main chain, and the functional group for bonding, which bonds with the transition metal, forms a side chain. Particularly, the transition metal has an oxidation number of +1.

Figure 2:
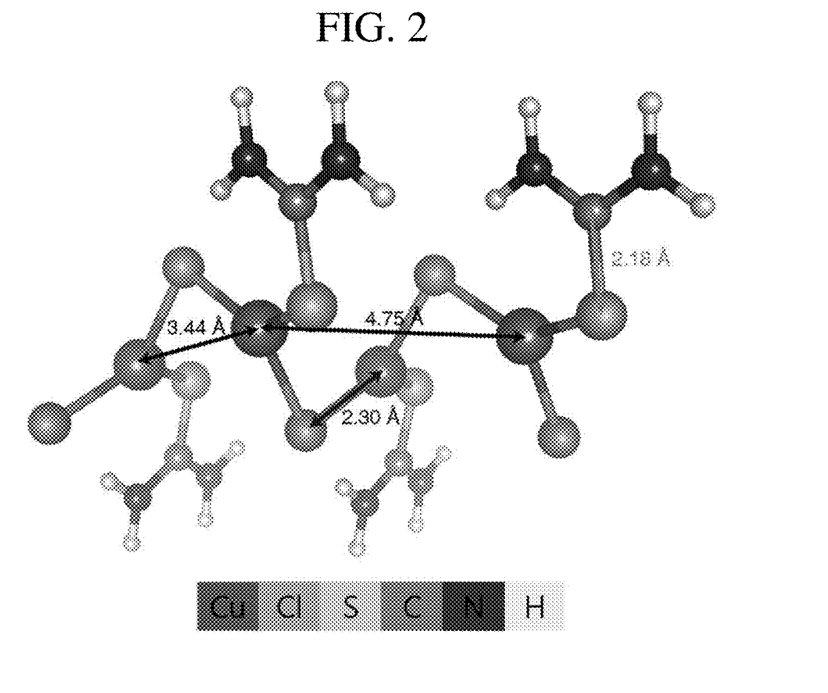
FIG. 2 is a schematic diagram of the inorganic polymer of FIG. 1 according to an exemplary embodiment of the present invention.

FIG. 2 is a schematic diagram of the inorganic polymer of FIG. 1 according to an exemplary embodiment of the present invention.

Referring to FIG. 2, a specific inorganic polymer forms a hydrogen bond with an adjacent inorganic polymer, and a nanowire through hydrogen bonding. The hydrogen bonding is made between a hydrogen element of the functional group for bonding and a halogen element of another inorganic polymer, or between the hydrogen element of the functional group for bonding and a Group 15 or 16 element of another inorganic polymer. Therefore, the inorganic polymer is bonded with an adjacent inorganic polymer, and forms an amorphous nanowire.

In further detail, in FIG. 1, Cu is used as a transition metal, Cl is employed as a halogen element, and thiourea is used as the functional group for bonding. Accordingly, the main chain of the inorganic polymer is CuCl, Cu is used as a central metal, and thiourea is bonded thereto. Sulfur (S) in the thiourea forms a bond with the central metal Cu.

In FIG. 2, two types of hydrogen bonds are made to form an amorphous nanostructure. The first type is a hydrogen bond between a hydrogen atom of thiourea forming a side chain and Cl, which is a halogen element in a main chain. The second type is a hydrogen bond between a hydrogen atom of thiourea and sulfur in a side chain. In either case, inorganic polymers are agglomerated or formed in a certain shape with a predetermined volume due to hydrogen bonding. In addition, the amorphous nanostructure formed via hydrogen bonding may have a wire shape, and a shape in which a hydrogen-halogen element bond and a bond between hydrogen-Group 16 element/hydrogen-Group 15 element are mixed.

The amorphous nanostructure is prepared through the following processes.

First, a synthetic solution containing a first metal precursor, a functional group for bonding and a polar solvent is prepared.

The first metal precursor includes a transition metal having several oxidation numbers and a halogen element, which are dissolved in a polar solvent. The transition metal to be introduced includes copper (Cu), manganese (Mn), iron (Fe), cadmium (Cd), cobalt (Co), nickel (Ni), zinc (Zn), mercury (Hg), molybdenum (Mo), titanium (Ti), magnesium (Mg), chromium (Cr) or antimony (Sb). In addition, the metal precursor includes the above-described transition metal, and includes a chloride, nitrate, sulfate, acetate, acetylacetonate, formate, hydroxide or an oxide having a halogen element, or a hydrate thereof.

The functional group for bonding has a hydrogen element and an element for hydrogen bonding, and the suitable functional group for bonding is preferably thiourea, urea, selenourea, tellurourea or a thiol compound. However, since the functional group for bonding has a hydrogen element and a Group 15 or 16 element, in addition to the above-described compounds, various choices are possible as needed at the level of one of ordinary skill in the art.

In addition, the prepared polar solvent is for dissolving or dispersing the first metal precursor and the functional group for bonding. The polar solvent to be used herein is an alcohol-based solvent, a glycol-based solvent, a polyglycol-based solvent or water. The alcohol-based solvent is methanol, ethanol, propanol or butanol. In addition, the polyglycol-based solvent is ethylene glycol, diethylene glycol or triethylene glycol.

In addition, a pH adjuster may be added to the polar solvent. Accordingly, polarity of the synthetic solution consisting of the dissolved first metal precursor and functional group for bonding, and the polar solvent is adjusted. Various shapes of nanostructures may be obtained by changing the diameter or length of nanostructures prepared according to the change in polarity of the synthetic solution. The pH adjuster may be acidic or basic, and may be hydrochloric acid, hydrofluoric acid, formic acid, acetic acid, hydrocyanic acid, sulfuric acid, nitric acid, carbonic acid, an amino acid, citric acid, ascorbic acid, potassium hydroxide, lithium hydroxide, sodium hydroxide, barium hydroxide, strontium hydroxide, copper hydroxide, beryllium hydroxide, a methoxylated ion, ammonia, an amidated ion, a methyl anion, a cyanized ion, an acetate anion, or a formate anion.

A synthetic solution containing a first metal precursor, a compound containing a functional group for bonding, and a polar solvent is formed through the above-described process. In addition, as described above, a pH adjuster may be added to the synthetic solution.

Subsequently, a process of manufacturing an amorphous nanostructure by using the synthetic solution is performed.

For example, an amorphous nanostructure is prepared in the synthetic solution through mixing, stirring, sonication, shaking, vibration, agitation or flowing of the synthetic solution.

In addition, a reaction temperature in the synthetic solution may be set in a range from 0° C. to the boiling point of the polar solvent, preferably 5° C. to 50° C., and more preferably 10° C. to 40° C. Since the temperature range may belong to room temperature, those of ordinary skill in the art may induce a reaction without temperature limitation.

In this reaction, the oxidation number of the first metal precursor is reduced to be +1, and a main chain of a central metal and a halogen element is formed. That is, while, in a pre-reaction state, the transition metal constituting the first metal precursor may have several oxidation numbers, and through the reaction, the transition metal constituting the first metal precursor has an oxidation number of +1 and acts as a central metal in the inorganic polymer. In addition, the halogen element included in the first metal precursor binds to the transition metal or central metal, thereby forming the main chain of the inorganic polymer. In the process of forming the main chain, some halogen elements that are not bonded with the central metal may be dissociated and suspended in an ionic state in the synthetic solution.

In addition, the functional group for bonding makes a chemical bond with the central metal. In the bonding process, the functional group for bonding donates an unshared electron pair to the central metal. Particularly, the functional group for bonding has a Group 15 or 16 element in addition to the hydrogen element, and these elements are bonded to the central metal by donating an unshared electron pair, and the hydrogen element forms a hydrogen bond with another synthesized inorganic polymer.

Accordingly, the inorganic polymers are synthesized, and hydrogen bonds are formed between the inorganic polymers, thereby forming an amorphous nanostructure. The above-described amorphous nanostructure may be formed as a nanowire or a spherical nanoparticle.

Subsequently, the amorphous nanostructure is mixed with a second metal precursor. Through bonding, the amorphous nanostructure reacts with the second meal precursor, thereby forming a meal nanoparticle.

The second metal precursor may include at least one selected from the group consisting of a chloride, fluoride, bromide, iodine, nitrate, nitride, sulfate, acetate, carbonate, citrate, cyanide, phosphate, acetylacetonate, formate, hydroxide, oxide and chlorometallic acid of a second metal element, and a hydrate thereof.

In addition, the second metal element is required to have a higher standard reduction potential than that of the central metal having an oxidation number of +1.

Therefore, a metal nanoparticle consisting of the second metal element is formed in a pore and on the surface of the amorphous nanostructure. The reaction in a pore and on the surface of the nanostructure is described as shown in Reaction Scheme 1 below.

[Reaction Scheme 1]

In Reaction Scheme 1, $M_1$ is the central metal of the inorganic polymer, and $M_2$ is the second metal element. In this formula, since the second metal element has a higher reducing force than the central metal, the central metal has an oxidation number of +2 or more and is dissociated from the main chain. In addition, electrons generated by the dissociation of the central metal are bonded with an ionized second metal element, and the ionized second metal element is reduced into a neutral second metal element.

The reduced second metal element is aggregated at a specific location, thereby forming a spherical metal particle. In addition, the second metal element may have a single crystal structure due to reduction at an atomic level.

The second metal element for the above-described reaction is a metal different from the central metal, and has a higher standard reduction potential than that of the central metal. To this end, the second metal element includes silver (Ag), gold (Au), platinum (Pt), palladium (Pd), ruthenium (Ru), iridium (Ir), osmium (Os), rhodium (Rh), cobalt (Co), sodium (Na), potassium (K), iron (Fe), cadmium (Cd), nickel (Ni), chromium (Cr), thallium (Tl), rubidium (Rb), zinc (Zn), copper (Cu), manganese (Mn), molybdenum (Mo), indium (In), gallium (Ga), bismuth (Bi), titanium (Ti), lead (Pb), aluminum (Al), magnesium (Mg) or antimony (Sb).

The second metal element has a tendency to be reduced in a specific area of the amorphous nanostructure, and agglomerated. In addition, the second metal element is formed into an approximately spherical metal nanoparticle, and has a structural characteristic of a single crystal. It is presumed that this is due to the result of forming a metallic material in atomic units through room temperature synthesis, without taking a rapid cooling path in a molten state.

For example, when the transition metal is Cu, the second metal element is preferably silver (Ag), gold (Au), platinum (Pt), palladium (Pd), ruthenium (Ru), osmium (Os), iridium (Ir) or rhodium (Rh).

A reaction between the amorphous nanostructure and the second metal precursor is preferably performed in a polar solvent. The polar solvent is used to dissolve and disperse the second metal precursor, and is preferably water, an alcohol-based solvent, a glycol-based solvent or a polyglycol-based solvent. The alcohol-based polar solvent may be methanol, ethanol, propanol or butanol, the polyglycol-based polar solvent may be ethylene glycol, diethylene glycol or triethylene glycol, and as a polar solvent, various materials, other than the mentioned materials, can be used.

In addition, the amorphous nanostructure and the second metal precursor may be subjected to mixing, stirring, sonication, shaking, vibration, agitation or flowing of a polar solvent, or a combination thereof. Through the mentioned method, an ultrasmall metal particle containing a second metal element may be simply and rapidly formed by uniformly dispersing the amorphous nanostructure and the second metal element-containing precursor in the solvent and reacting them.

In addition, a plurality of second metal precursors including different second metal elements may be formed, and an alloy-type ultrasmall metal nanoparticle may be formed. That is, second metal precursors including two or more types of metals having a higher standard reduction potential than the central metal may be formed, and alloy nanoparticles in which two or more types of second metal elements are mixed may be formed by mixing and stirring thereof. Therefore, alloys of various metals may be formed in a nano size.

Subsequently, the synthesized metal nanoparticles are stirred with a support having a plurality of pores. The metal nanoparticles are uniformly absorbed or dispersed in the pores of the support by stirring and filtration. Therefore, a composite may be formed. Since the synthesized metal nanoparticles have no functional groups on their surfaces and a very small hydrodynamic radius, they may be applied to various supports having pores. In addition, when the surface charge state of the support is properly adjusted, the absorption or adsorption amount of the metal nanoparticles is maximized. In addition, surface treatment may be performed on the support with pores.

The surface treatment of the support is preferably performed before the stirring and filtration step of the metal nanoparticles and the support. For example, the surface of the support may be modified by acid treatment on the support, and a positively-charged functional group may be introduced on the inner surface of a pore of the support. Accordingly, the amount of metal nanoparticles adsorbed into the pores of the support may be increased.

In addition, the surface treatment of the support may be simultaneously performed with mixing and filtration of the metal nanoparticles. That is, a pH adjuster may be put into the synthetic solution in which the metal nanoparticles are formed, and acid treatment on the inner surface of the pore and an exposed surface may be simultaneously performed with mixing of the support. Therefore, a positively-charged functional group is introduced.

When the positively-charged functional group is introduced onto the inner surface of a pore and the surface of the support, the metal nanoparticles are easily adsorbed into a pore of the support.

Preparation Example 1: Synthesis of Metal Nanoparticles with Single Element 50 mg of $CuCl_2$ used as a first metal precursor and 50 mg of thiourea powder used as a functional group for bonding are put into a beaker. 200 ml of ethanol as a polar solvent is put into the beaker. The mixed solution of $CuCl_2$, thiourea and ethanol is subjected to ultrasonic dispersion at room temperature. As a result of dispersion, a S, N, C and H-containing copper-chloride amorphous nanowire having Cu—Cl as a main chain is synthesized within 1 to 2 minutes.

Subsequently, respective second metal precursors are prepared. The prepared second metal precursors include a second metal elements having a higher standard reduction potential than Cu, which is the central metal of the amorphous nanowire of Preparation Example 1. The second metal precursors are ruthenium (III) chloride hydrate, a rhodium (III) nitrate solution, a palladium(II) chloride solution, silver nitrate, osmium(III) chloride trihydrate, iridium(III) chloride hydrate, a chloroplatinic acid solution and a gold(III) chloride solution, respectively.

Each of the second metal precursors is sufficiently dissolved in 200 mL of ethanol, which is a polar solvent, at room temperature. After each ethanol solution containing a second metal precursor is put into a beaker in which 0.4 mmol of the prepared copper-chloride amorphous nanowire is dispersed in 200 mL of ethanol, the solution is stirred for several minutes, thereby preparing crystalline metal nanoparticles.

The molar mass of the copper-chloride amorphous nanowire is 175.12 g/mol, and finally a 0.4 mmol copper-chloride amorphous nanowire is formed. The amount of precursor put thereinto is equivalent to 0.48 mmol of each metal.

Figure 3:
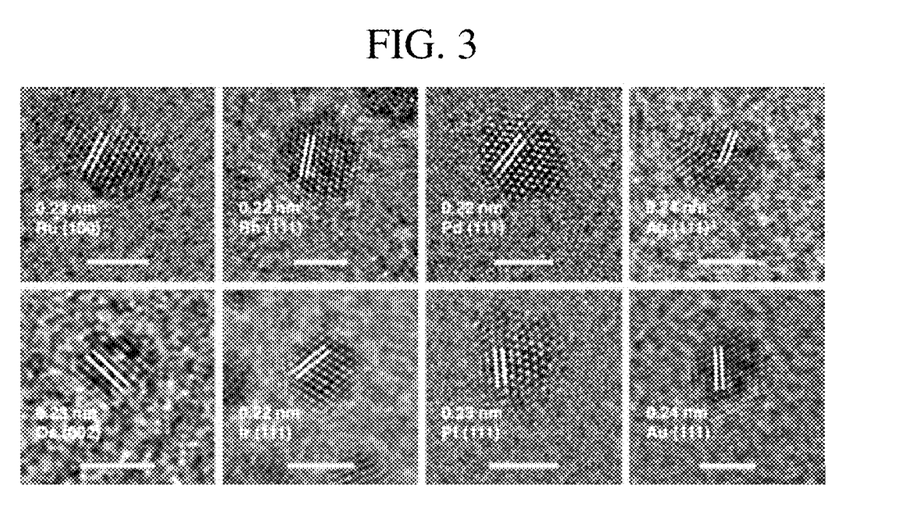
FIG. 3 is a set of images of metal nanoparticles prepared according to Preparation Example 1 of the present invention.

FIG. 3 is a set of images of metal nanoparticles prepared according to Preparation Example 1 of the present invention.

Referring to FIG. 3, metal nanoparticles of Ru, Rh, Pd, Ag, Os, Ir, Pt and Au appear. The metal nanoparticles show a crystalline phase, and have a diameter of approximately 2 to 2.5 nm. In addition, on a high-resolution transmission electron microscopy (TEM) image, a (100), (111) or (002) plane is shown. These lattice planes appeared clearly means that the ultrasmall nanoparticles have high crystallinity. A scale ranging from 0.22 nm to 0.24 nm, shown in each image, refers to a lattice constant of a corresponding plane. Considering the lattice constant of the corresponding plane, the metal nanoparticles formed in atomic units exhibit a single crystal characteristic, and have a uniform diameter of 2 nm to 2.5 nm.

Preparation Example 2: Synthesis of alloy Nanoparticles Consisting of Two Types of Second Metal Elements In this preparation example, alloy nanoparticles consisting of two types of second metal elements are formed. To this end, second metal precursors, such as a rhodium(III) nitrate solution, a palladium(II) chloride solution, a chloroplatinic acid solution, osmium(III) chloride trihydrate and a gold(III) chloride solution, are dissolved in 200 mL of ethanol at room temperature according to the type of desired nanoparticle. The composition of the prepared alloy nanoparticles is able to be changed according to the type of mixed solution.

In addition, the copper-chloride amorphous nanowire of Preparation Example 1 is put into the mixed solution, and stirred. To this end, various types of alloy nanoparticles are able to be obtained, and each alloy nanoparticle includes a mixture of two types of metal elements.

Figure 4:
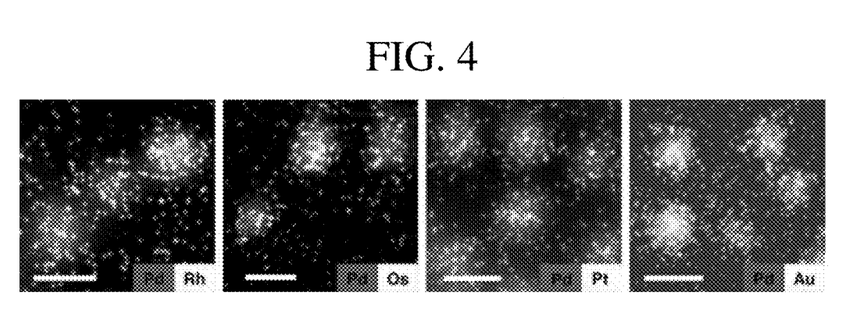
FIG. 4 is a set of high-resolution STEM images and EDS mapping images of alloy nanoparticles according to Preparation Example 2 of the present invention.

FIG. 4 is a set of high-resolution STEM images and EDS mapping images of alloy nanoparticles according to Preparation Example 2 of the present invention.

Referring to FIG. 4, to form Pd/Rh alloy nanoparticles, a palladium(II) chloride solution and a rhodium(III) nitrate solution in a molar ratio of 1:2 are dissolved in 200 mL ethanol. In addition, to form Pd/Os alloy nanoparticles, a palladium(II) chloride solution and osmium(III) chloride trihydrate of a molar ratio of 1:2 are dissolved in 200 mL ethanol. To form Pd/Pt alloy nanoparticles, a palladium(II) chloride solution and a chloroplatinic acid solution are dissolved in 200 mL ethanol in a molar ratio of 1:1. In addition, to form Pd/Au alloy nanoparticles, a palladium(II) chloride solution and a gold(III) chloride solution are dissolved in 200 mL ethanol in a molar ratio of 3:1.

Each of the four types of mixed solutions contains 200 mL ethanol, and 0.4 mmol of the copper-chloride amorphous nanowire of Preparation Example 1 is added thereto, and then stirred. Therefore, Pd/Rh, Pd/Os, Pd/Pt and Pt/Au alloy nanoparticles are able to be prepared. In FIG. 4, it can be seen that each alloy nanoparticle has a composition proportional to the amount of second metal precursor used. That is, when the mixed solution is prepared by mixing of the second metal precursor, proportional to the molar ratio of the added second metal precursors, an ultrasmall alloy nanoparticle having a composition of Pd:Rh=1:2, Pd:Os=1:2, Pd:Pt=1:1 or Pd:Au=3:1 is prepared. As seen from FIG. 4, these two types of second metal elements are well mixed in a particle. A total amount of the second metal precursors (the sum of amounts of two second metal precursors) is 1.2 mole per mole of the copper-chloride amorphous nanowire.

The alloy nanoparticles prepared in this preparation example have a uniform size of approximately 2 nm.

Preparation Example 3: Synthesis of Au/Ir/Pd/Pt/Rh Alloy Nanoparticle

An alloy nanoparticle in which five types of different metal elements are mixed is shown in this preparation example. Second metal precursors, such as a rhodium(III) nitrate solution, a palladium(II) chloride solution, a chloroplatinic acid solution, a gold(III) chloride solution and iridium(III) chloride hydrate, are dissolved in 200 mL of ethanol at room temperature for 3 minutes by stirring. The second metal precursors containing Rh, Pd, Pt, Au and Ir are dissolved in ethanol in a molar ratio of 1:1:1:1:1. The mixed solution is mixed with 200 mL of ethanol containing 0.4 mmol of the copper-chloride amorphous nanowire prepared in Preparation Example 1, and stirred for several minutes, thereby forming an alloy nanoparticle containing five types of metal elements.

Figure 5:
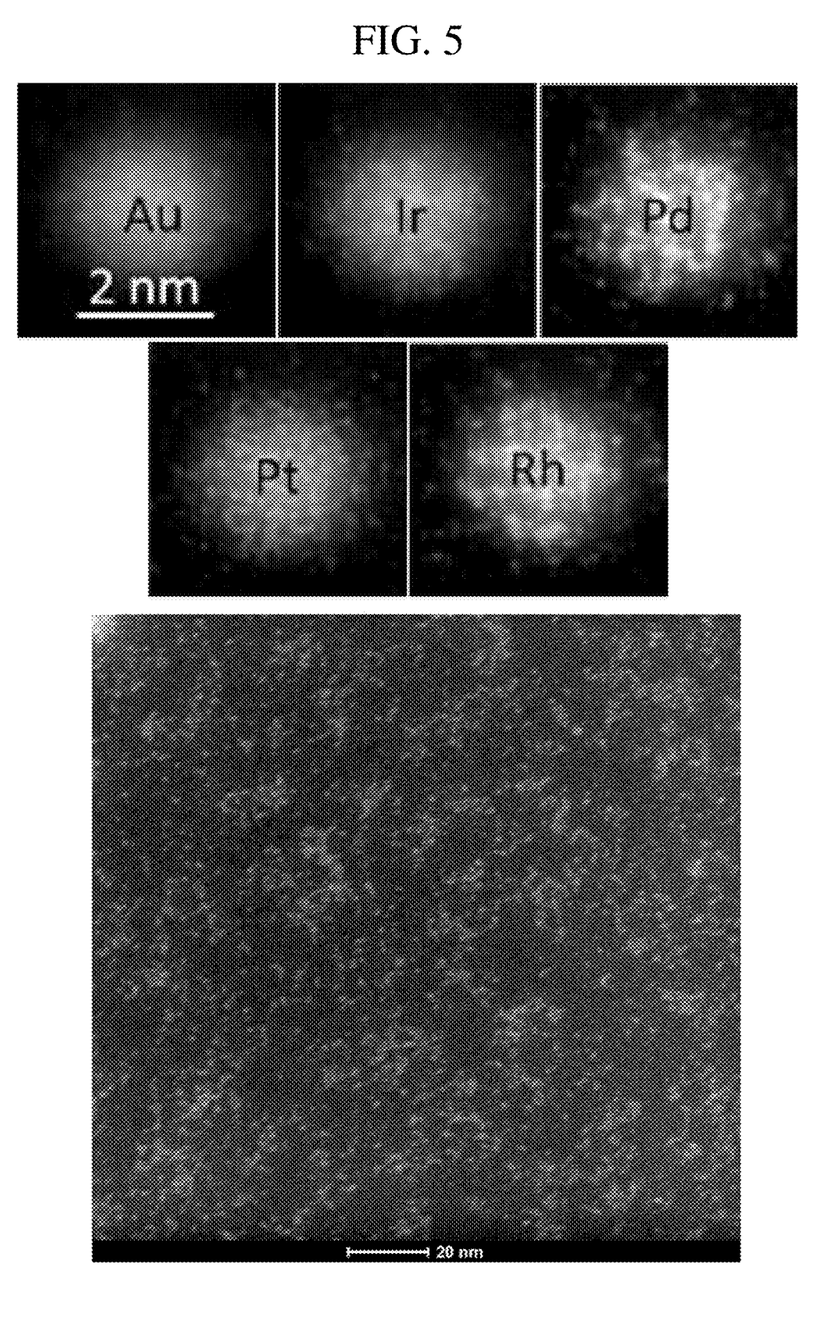
FIG. 5 is a set of STEM images and EDS mapping images of Au/Ir/Pd/Pt/Rh alloy nanoparticles prepared according to Preparation Example 3 of the present invention.

FIG. 5 is a set of STEM images and EDS mapping images of Au/Ir/Pd/Pt/Rh alloy nanoparticles prepared according to Preparation Example 3 of the present invention.

Referring to FIG. 5, an alloy nanoparticle consisting of five types of metal elements in which Au/Ir/Pd/Pt/Rh are uniformly mixed is produced. The total amount of the second metal precursors (the sum of the amounts of five types of second metal precursors) is 1.2 mole per mole of the copper-chloride polymer nanostructure. It can be seen that the particles prepared in Preparation Example 3 have a uniform size of approximately 2 to 2.5 nm.

Preparation Example 4: Adjustment of Composition of Alloy Nanoparticle Containing Au and Rh In this preparation example, the composition of an alloy nanoparticle is determined while changing an amount of precursor used.

To prepare a nanoparticle having an atomic percentage of Au:Rh=0.8:2 a gold(III) chloride solution containing 0.384 mmol of Au and a rhodium(III) nitrate solution containing 0.096 mmol of Rh are dissolved in 200 mL of ethanol.

To prepare a nanoparticle having an atomic percentage of Au:Rh=0.6:0.4, a gold(III) chloride solution containing 0.288 mmol of Au and a rhodium(III) nitrate solution containing 0.192 mmol of Rh are dissolved in 200 mL of ethanol.

To prepare a nanoparticle having an atomic percentage of Au:Rh=0.4:0.6, a gold(III) chloride solution containing 0.192 mmol of Au and a rhodium(III) nitrate solution containing 0.288 mmol of Rh are dissolved in 200 mL of ethanol.

To prepare a nanoparticle having an atomic percentage of Au:Rh=0.2:0.8, a gold(III) chloride solution containing 0.096 mmol of Au and a rhodium(III) nitrate solution containing 0.384 mmol of Rh are dissolved in 200 mL of ethanol.

A solution prepared by dispersing 0.4 mmol of the copper-chloride polymer nanostructure prepared in Preparation Example 1 in 200 mL of ethanol is mixed with a total of 200 mL of ethanol solution containing Au and Rh.

Figure 6:
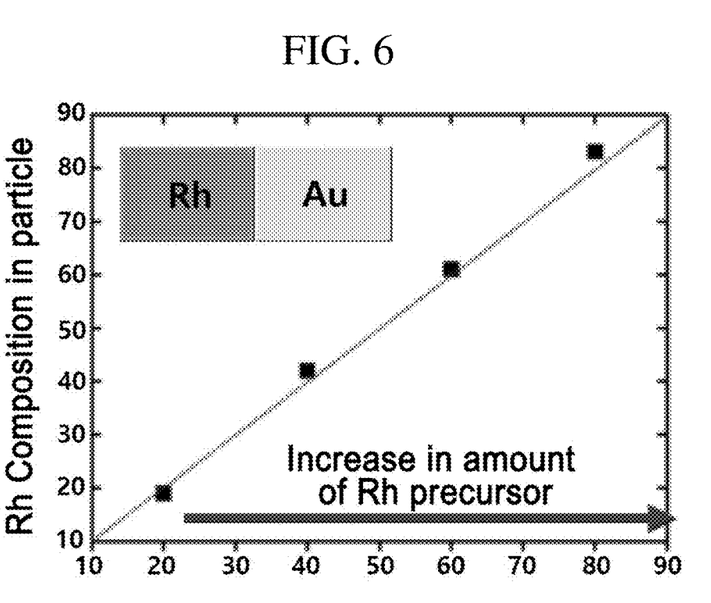
FIG. 6 is a graph showing the composition of Au/Rh alloy nanoparticles according to Preparation Example 4 of the present invention.

FIG. 6 is a graph showing the composition of Au/Rh alloy nanoparticles according to Preparation Example 4 of the present invention.

Referring to FIG. 6, it can be seen that the amount of second metal precursor used is proportional to the composition of the final alloy nanoparticle. To this end, it can be seen that it is very easy to adjust the composition of alloy nanoparticle.

In addition, in this preparation example, the total molar ratio of the second metal elements in the second metal precursors is 1.2 mole per mole of the copper-chloride amorphous nanostructure. In this preparation example, the prepared particles have a diameter of 2 to 2.5 nm.

Preparation Example 5: Absorption Amount of Metal Nanoparticle According to Functional Group on Support Surface An experiment in which a 400 mL solution in which 0.48 mmol of the Pd nanoparticle prepared in Preparation Example 1 is dispersed is added to porous silica having 5-nm cylindrical pores is performed. To this end, 25 mg of silica is used.

The following Table 1 shows a state of a silica support.

TABLE 11

| Sample | Silica (cylindrical type) | Surface functional group | Preparation method | Pd concentration (wt %) |
|---|---|---|---|---|
| 1 | Original form | Si—O$^-$ | | 0 |
| 2 | Original form | Si—O$^-$ | Filtration | 0.003 |
| 3 | Surface-modified | NH$^+$ or NH$_3^+$ | | 0 |
| 4 | Surface-modified | NH$^+$ or NH$_3^+$ | Filtration | 2.52 |
| 5 | Surface-modified | NH$^+$ or NH$_3^+$ | Filtration | 8.57 |

In Table 1, Sample 1 is silica in an original form, and an Si—O$^-$ functional group is shown on its surface. In addition, since silica is not added to a solution in which metal nanoparticles are formed, a Pd concentration is not shown. For Sample 2, a silica support is added to a solution in which Pd nanoparticles are formed, such that the solution in which metal nanoparticles are formed is filtered by the support. That is, the metal nanoparticle solution is allowed to pass through the support, such that the adsorption of the formed metal nanoparticle to a pore of the support is induced. As shown in Table 1, the Pd concentration in the support is very low.

Sample 3 is subjected to surface modification by substitution with NH$^+$ or NH$_3^+$ on the silica surface.

Sample 4 is produced through filtration by the support whose surface is substituted with NH$^+$ or NH$_3^+$. As shown in Table 1, 2.52 wt % of Pd nanoparticles are detected. For detection, ICP analysis is used, thereby confirming that the metal nanoparticles are adsorbed to the support which is surface-modified with a cationic functional group, and it is possible to prepare a composite.

Sample 5 is prepared by immersing the silica support of Sample 3 in the solution in which Pd nanoparticles are formed, and stirring and filtering the resulting product for 6 hours. Through ICP analysis, it can be seen that 8.57 wt % of the Pd nanoparticles are detected in the support, indicating that a composite of the silica support and the Pd nanoparticles is formed.

Figure 7:
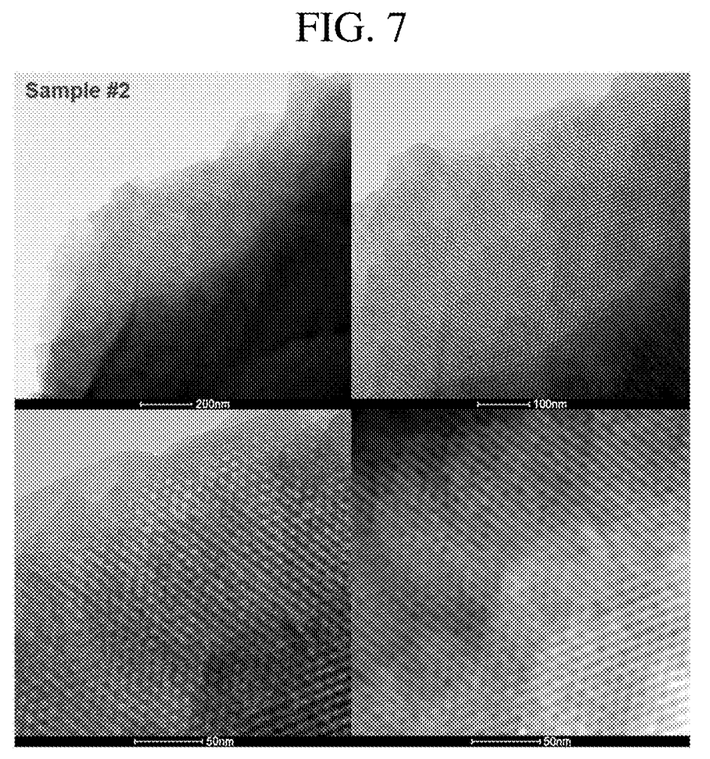
FIG. 7 is a set of TEM images of Sample 2 according to Preparation Example 5 of the present invention.

FIG. 7 is a set of TEM images of Sample 2 according to Preparation Example 5 of the present invention.

Referring to FIG. 7, although a very small amount of the Pd nanoparticles is adsorbed through filtration, they are not shown in the image. However, it can be seen that pores of the silica are uniformly shown.

Figure 8:
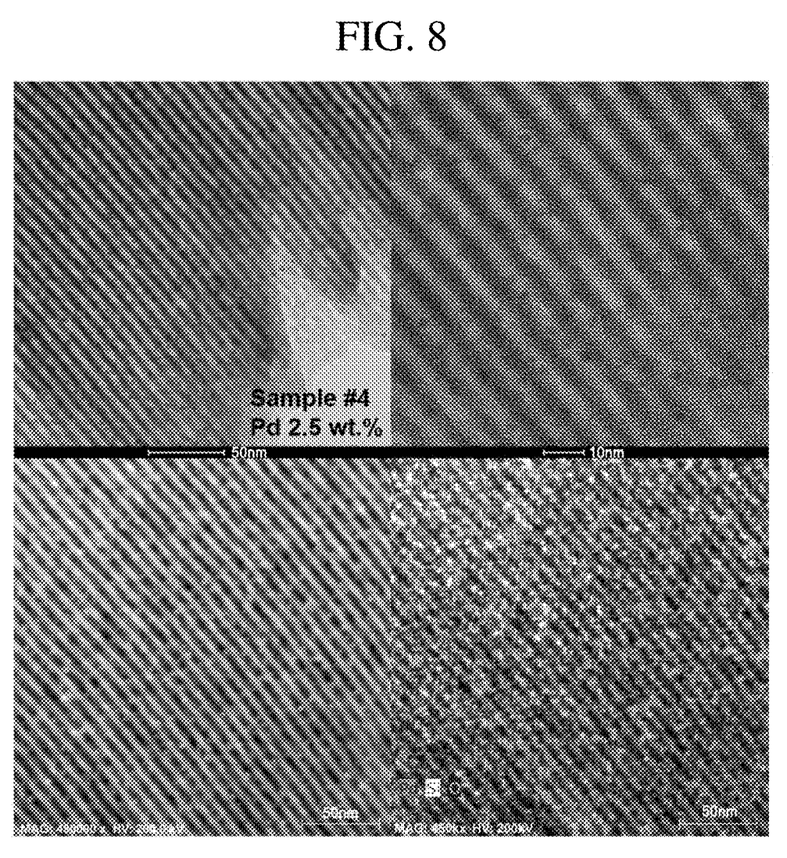
FIG. 8 is a set of a TEM image, a STEM image and EDS mapping images of Sample 4 according to Preparation Example 5 of the present invention.

FIG. 8 is a set of a TEM image, a STEM image and EDS mapping images of Sample 4 according to Preparation Example 5 of the present invention.

Referring to FIG. 8, although a functional group is changed by surface treatment of silica, it can be seen that 5-nm pores are well developed, and 2.5 wt % of Pd nanoparticles are evenly adsorbed and dispersed in the pores of the silica.

Figure 9:
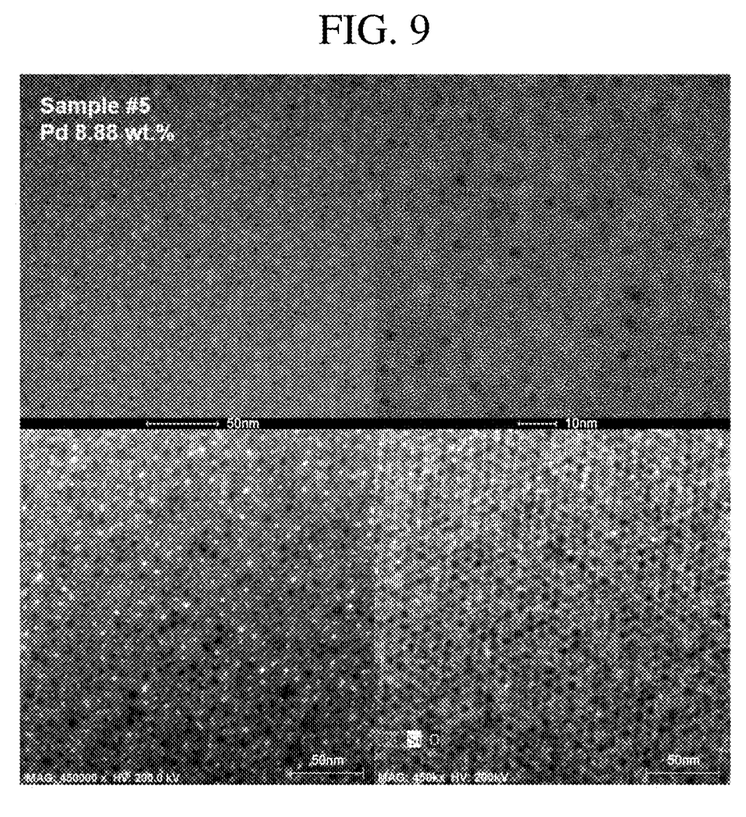
FIG. 9 is a set of a TEM image, a STEM image and EDS mapping images of Sample 5 according to Preparation Example 5 of the present invention.

FIG. 9 is a set of a TEM image, a STEM image and EDS mapping images of Sample 5 according to Preparation Example 5 of the present invention.

Referring to FIG. 9, it can be seen that a large amount of Pd nanoparticles is evenly adsorbed and dispersed in the silica pores.

Experimental Example 1: Confirmation of the Presence or Absence of Functional Group on Metal Nanoparticle Surface To confirm the surface state of a metal nanoparticle, the Au nanoparticle prepared in Preparation Example 1 is centrifuged at 40,000 rpm for 20 minutes and then washed with water. As a result of observing the Au nanoparticles washed twice through STEM, it is confirmed that the Au nanoparticles are aggregated.

Figure 10:
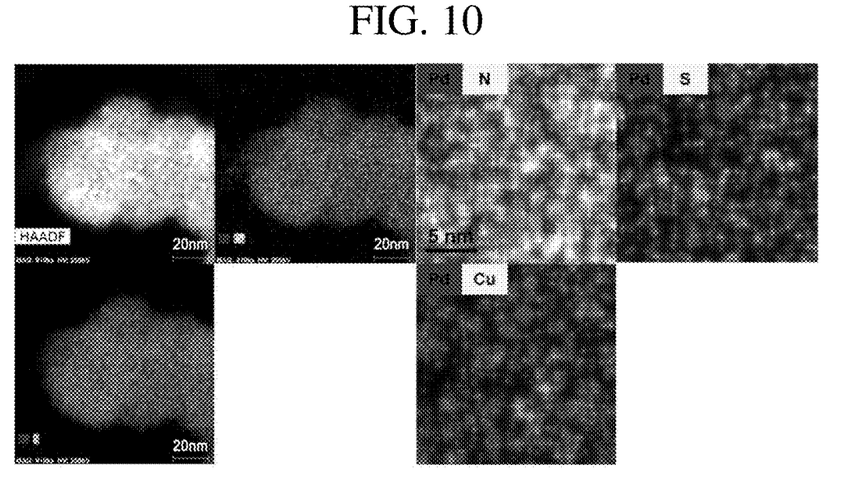
FIG. 10 is a set of STEM images and EDS mapping images of Au nanoparticles clustered in Preparation Example 1 of the present invention, and Sample 5 of Preparation Example 5.

FIG. 10 is a set of STEM images and EDS images of Au nanoparticles and Sample 5 of Preparation Example 5, which are aggregated according to Experimental Example 1 of the present invention.

Referring to three images on the left side of FIG. 10, it can be confirmed that the Au nanoparticles are clustered. In addition, C, N or Cl contained in the copper-chloride amorphous nanowire of Preparation Example 1 is not shown in the aggregate. This is summarized in Table 2 below.

TABLE 2

| Element | Atomic composition (%) |
|---|---|
| Au | 78.4 |
| S | 14.0 |
| Cu | 7.6 |
| C | 0 |
| N | 0 |
| Cl | 0 |

In Table 2, the percentages of elements constituting the aggregates of the Au nanoparticles shown in the three images on the left side of FIG. 10 are shown. Since the composition of C, N and Cl is not shown in the EDS mapping image, the Au nanoparticles do not have a functional group containing C, N or Cl. However, S and Cu particles are found and it is determined that they cannot constitute a functional group. It is predicted that, during centrifugation, S and Cu ions dissolved in a solvent contribute to the aggregation of Au nanoparticles. In addition, since the synthesized metal nanoparticle has a diameter of approximately 2 nm, it is very difficult to independently determine the surface state of one metal nanoparticle. However, in Sample 5 of Preparation Example 5, Pd nanoparticles absorbed in the pores of the support are confirmed through EDS mapping.

Referring to the three images on the right side of FIG. 10, the percentages of the elements included in the images are shown in Table 3 below.

TABLE 3

| Element | Atomic composition (%) |
|---|---|
| Si | 30.4 |
| O | 53.7 |
| Pd | 3.3 |
| Cu | 0.8 |
| S | 0.3 |
| N | 11.5 |

The high atomic percentages of Si and O in Table 3 are due to the fact that the support is silica. In addition, Cu and S are contained at very low levels, which is not meaningful data because small amounts thereof are slightly introduced during filtration and stirring. That is, Cu and S do not form a significant chemical bond around or on the surface of a Pd nanoparticle, and do not serve as a functional group. N having a relatively high percentage is caused by the support of Sample 5 having a functional group of $NH^+$ or $NH_3^+$. That is, it can be seen that the functional group of $NH^+$ or $NH_3^+$ acts as a medium for adsorbing the metal nanoparticle to the support. In Experimental Example 1, it can be seen that the metal nanoparticle does not form a significant chemical bond with elements constituting a copper-chloride amorphous nanowire on its surface. In addition, it is regarded that a 2 nm metal nanoparticle is well adsorbed to and dispersed in a 5 nm pore, and thus there is no functional group on the nanoparticle surface.

According to the result of Experimental Example 1, the metal nanoparticles are highly adsorbed to the support surface-treated with a $NH^+$ or $NH_3^+$ functional group. It is expected that this is due to the surface of the metal nanoparticle being negatively charged. In the negatively charged metal nanoparticles, the second metal element is reduced in an ionic state, a crystal structure is formed through reduction at an atomic level, and it is expected that electrons are excessively provided from central metals while being formed into nanoparticles.

By using negatively charged metal nanoparticles, a plurality of metal nanoparticles may be adsorbed and dispersed in pores of the support.

That is, when acid treatment is performed on the support, cations or cationic functional groups may be formed in pores or on the surface of the support at a high density. Metal nanoparticles may be highly adsorbed into the pores by cationic functional groups formed at a high density.

As described in various preparation examples and experimental examples of the present invention, an inorganic polymer having a central metal and a halogen element as a main chain forms an amorphous nanostructure via hydrogen bonding. In addition, when a second metal element having a higher standard reduction potential than that of the central metal is mixed with the amorphous nanostructure in a polar solvent, due to a high reducing force, the second metal element is reduced, thereby forming a 2 nm to 2.5 metal nanoparticle. The metal nanoparticle formed in the polar solvent is easily adsorbed into a pore of a support that is surface-treated with a cation while maintained in a nano size.

Therefore, a composite is formed with the support and the metal nanoparticles, and the composite may be used in various applications such as a catalyst depending on the type of second metal element constituting the metal nanoparticle.

Particularly, metal nanoparticles that do not have a functional group on the surface are expected to exhibit excellent performance in a reaction of a catalyst, and since the metal nanoparticles are adsorbed into the support in a nano size, a large specific surface area may be secured.

The invention claimed is:

1. A composite comprising:
   a support having a large number of pores and a positive charge on its surface; and
   metal nanoparticles that are adsorbed into the pores and have a diameter of 2 nm to 2.5 nm,
   wherein the metal nanoparticles comprise silver (Ag), gold (Au), platinum (Pt), palladium (Pd), ruthenium (Ru), indium (Ir), osmium (Os), rhodium (Rh), cobalt (Co), sodium (Na), potassium (K), iron (Fe), cadmium (Cd), nickel (Ni), chromium (Cr), thallium (Tl), rubidium (Rb), zinc (Zn), copper (Cu), manganese (Mn), molybdenum (Mo), indium (In), gallium (Ga), bismuth (Bi), titanium (Ti), lead (Pb), aluminum (Al), magnesium (Mg) or antimony (Sb).

2. The composite of claim 1, wherein the metal nanoparticle is a single crystal, and has a (100), (111) or (002) plane.

3. The composite of claim 2, wherein, in the metal nanoparticle, the (100), (111) or (002) plane on a scanning transmission microscopic image has a lattice constant of 0.22 nm to 0.24 nm.

4. The composite of claim 2, wherein the metal nanoparticle has a higher standard reduction potential than that of copper, and comprises silver (Ag), gold (Au), platinum (Pt), palladium (Pd), ruthenium (Ru), osmium (Os), iridium (Ir) or rhodium (Rh).

5. The composite of claim 1, wherein the metal nanoparticle is composed of two or more kinds of metal elements, and is an amorphous alloy.

6. The composite of claim 5, wherein the two or more kinds of metal elements have a higher standard reduction potential than copper, and include silver (Ag), gold (Au), platinum (Pt), palladium (Pd), ruthenium (Ru), osmium (Os), iridium (Ir) or rhodium (Rh).

7. The composite of claim 1, wherein the support is porous silica having a positive charge on the surface thereof.

8. The composite of claim 7, wherein the positive charge is $NH^+$ or $NH_3^+$.

* * * * *